(12) United States Patent
Acharya

(10) Patent No.: US 8,341,158 B2
(45) Date of Patent: Dec. 25, 2012

(54) USER'S PREFERENCE PREDICTION FROM COLLECTIVE RATING DATA

(75) Inventor: Chiranjit Acharya, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1740 days.

(21) Appl. No.: 11/284,603

(22) Filed: Nov. 21, 2005

(65) Prior Publication Data
US 2007/0118546 A1   May 24, 2007

(51) Int. Cl.
  G06F 7/00 (2006.01)
  G06F 17/30 (2006.01)
  G06Q 30/00 (2012.01)
(52) U.S. Cl. .................. 707/738; 707/739; 705/26.7
(58) Field of Classification Search .......... 707/737–740, 707/948, 776; 705/26.7
  See application file for complete search history.

(56) References Cited

U.S. PATENT DOCUMENTS

| 5,704,017 | A | 12/1997 | Heckerman et al. |
| 6,092,049 | A | 7/2000 | Chislenko et al. |
| 6,321,179 | B1 * | 11/2001 | Glance et al. ................ 702/189 |
| 6,460,035 | B1 * | 10/2002 | Siegwart .......................... 707/6 |
| 6,655,963 | B1 * | 12/2003 | Horvitz et al. ................ 434/236 |
| 6,981,040 | B1 * | 12/2005 | Konig et al. .................. 709/224 |
| 2002/0010625 | A1 * | 1/2002 | Smith et al. ..................... 705/14 |
| 2004/0054572 | A1 * | 3/2004 | Oldale et al. ................... 705/10 |

OTHER PUBLICATIONS

Breese et al., "Emperical Analysis of Predictive Algorithms for Collaborative Filtering", Oct. 1998, Microsoft Corp., pp. 1-20.*
Ungar et al., "A Formal Approach to Collective Filtering", Conference on Automated Learning and Discovery, 1998, retrieved from internet [http://www.cis.upenn.edu/~ungar/papers/CONALD.ps], 6 pages.*

* cited by examiner

*Primary Examiner* — James E Richardson
(74) *Attorney, Agent, or Firm* — Fitch, Even, Tabin & Flannery, LLP

(57) ABSTRACT

A computer-implemented method includes receiving a dataset representing a plurality of users, a plurality of items, and a plurality of ratings given to items by users; clustering the plurality of users into a plurality of user-groups such that at least one user belongs to more than one user-group; clustering the plurality of items into a plurality of item-groups such that at least one item belongs to more than one item-group; inducing a model describing a probabilistic relationship between the plurality of users, items, ratings, user-groups, and item-groups, the induced model defined by a plurality of model parameters; and predicting a rating of a user for an item using the induced model.

18 Claims, 8 Drawing Sheets

| | $v_1$ | $v_2$ | $v_3$ | . | . | . | $v_n$ |
|---|---|---|---|---|---|---|---|
| $u_1$ | $w_{11}$ | $w_{12}$ | $w_{13}$ | | | . | $w_{1n}$ |
| $u_2$ | $w_{21}$ | | | | | | . |
| $u_3$ | $w_{31}$ | | | | | | . |
| . | . | | | | | | . |
| . | . | | | | | | . |
| . | . | | | | | | . |
| $u_m$ | $w_{m1}$ | . | . | . | . | . | $w_r$ |

700

|     | $z_1^u$ | $z_2^u$ | | $z_i^u$ | | $z_g^u$ |
|-----|---|---|---|---|---|---|
| $u_1$ | | | | | | |
| $u_2$ | | | | | | |
| ⋮ | | | ......... | | ...... | |
| $u_x$ | | | | | ← 702 | |
| ⋮ | | | ......... | | ...... | |
| $u_m$ | | | | | | |

|     | $z_1^v$ | $z_2^v$ | | $z_j^v$ | | $z_h^v$ |
|-----|---|---|---|---|---|---|
| $v_1$ | | | | | | |
| $v_2$ | | | | | | |
| ⋮ | | | ......... | | ...... | |
| $v_y$ | | | | | ← 802 | |
| ⋮ | | | ......... | | ...... | |
| $v_n$ | | | | | | |

FIG. 8

| $Z^u$ | $Z^v$ | $W$ | $P(W|Z^u, Z^v)$ |
|---|---|---|---|
| | | | |
| | | | |
| | | | |
| | | | |
| $z_i^u$ | $z_j^v$ | $w_k$ | |
| | | | |
| | | | |
| | | | |

FIG. 9

USER'S PREFERENCE PREDICTION FROM COLLECTIVE RATING DATA

BACKGROUND OF THE INVENTION

1. Field of the Invention

The present invention relates generally to preference prediction systems, and more specifically to preference prediction systems adapted to predict user's preference with respect to an item and to recommend the item based on the prediction.

2. Discussion of the Related Art

Preference prediction systems typically attempt to predict a user's preferences with respect to a collection of items (e.g., music, movies, TV shows, news articles, web-sites, etc.) and produce a subset of recommended items based on the predicted preferences of the user. Preference prediction systems can typically be classified as content-based, knowledge-based, collaborative, or some combination thereof. Content-based preference prediction systems recommend items that are similar to items the particular user has recommended in the past. Knowledge-based preference prediction systems attempt to recommend items to a user using knowledge about the user and items to reason which items meet the user's requirements.

Collaborative preference prediction systems generate recommendations by collecting preferences (usually in the form of a rating selected from a predetermined rating scale) from individual users about individual items, conditionally aggregating the collected preferences based on a predetermined similarity metric between the individual users; transforming the conditionally aggregated preferences into one or more recommendations, and propagating the one or more recommendations the individual users based on the predetermined similarity metric. Accordingly, conventional collaborative preference prediction systems generally assume that similar users will have similar preferences for the same items and, thus, rate the items similarly. Most collaborative preference prediction systems can typically be classified as case-based or model-based systems.

In case-based systems, a database of rating information for all available user-item combinations is maintained and preference predictions are generated by applying standard database search techniques. Specifically, preference predictions are made by searching the database to find training users (i.e., users having user-item combinations stored on the database) that are similar to a test user (i.e., a current user of the collaborative preference prediction system). To determine similarity, case-based systems define a distance metric between the test user and the training users. One such distance metric is obtained using the Pearson product moment correlation coefficient. Another is the cosine measure, which is a special case of the Pearson metric with a zero mean. Another metric, similar to the TF-IDF approach, gives higher weight to users who rate infrequently. Yet another alternative employs a "case amplification" approach where ratings stored on the database are varied through a predetermined non-linear function based on predetermined heuristic criteria.

Once the similarity metric is defined, the case-based system can attempt to recommend an item that has not been rated by the test user. Item recommendation is typically accomplished using a k-nearest neighbor algorithm to predict a rating that a test user will give to a particular item. The predicted rating is typically an average of ratings given by training users that have been determined to be similar to the test user, weighted according to the degree of similarity (i.e., correlation) between the training and test users. Further, only neighbors with positive correlations are typically considered in the recommendation process.

Case-based systems can be classified as item-item or user-user systems. In item-item systems, the k-nearest neighbors are other items which can be thought of as points embedded within a space whose dimensions (e.g., axes) correspond to users. In this view, the correlation coefficient can be regarded as computing a distance between two items in a space of users. In user-user systems, the k-nearest neighbors are other users which can be thought of as the distance between two points embedded within a space whose dimensions (e.g., axes) correspond to items. Accordingly, the correlation coefficient can be regarded as computing a distance between two users in a space of items.

Case-based systems are conceptually simple, intuitive, and produce reasonable predictions in many real-world applications. Further, case-based systems do not require a training phase because user-item combinations are generated and stored in real time and, therefore, their off-line computational requirements can be minimal. However, as the number of users, and as the number of items ratable by the users increases, the on-line computational requirements required, for example, to execute the k-nearest neighbor algorithm and predict ratings increases. Moreover, case-based systems do not allow for the discovery of possible hidden relationships existing between users, items, and ratings. Lastly, it can be difficult to improve the predictive performance of case-based systems because of the inherent heuristic criteria embedded within, for example, the k-nearest neighbor algorithm.

Unlike case-based systems, model-based systems generate preference predictions by inducing models from training data stored in a database. The induced models attempt to rationally explain the training data and are then used to predict a rating that a test user will give to a particular item. Typically, the model-induction process is performed by applying Bayesian network, clustering, decision tree, Gaussian mixture model, dimensional reduction model (e.g., factor analysis, principal component analysis, etc.) analyses to the training data. Because model-based systems undergo an intensive training phase to the induce models, their off-line computational requirements are much higher compared to the off-line computational requirements of case-based systems but their on-line computational requirements are relatively low.

Conventional model-based systems employing a clustering analysis wherein items and/or users within the training data are explicitly clustered into groups based on some similarity metric. A rating for a test user is then predicted simply by using ratings specific only to the groups generated from the training data that maximally fit with the test user and/or items to be rated. While such a clustering analysis to model-based systems can be useful, the manner in which users and items within the training data are clustered becomes critically important. Accordingly, conventional model-based systems employing a clustering analysis have a potential drawback in that the predictive accuracy of the model-based system will be adversely affected if the user and/or item groups are not appropriately clustered. Moreover, conventional model-based systems employing a clustering analysis have another drawback in that each user and/or item is clustered into only one group, resulting in predictions reflecting only one particular characteristic of the test user and/or items within the training data. In reality, however, it is possible for a user to be clustered into many groups based on, for example, interest, age, location, etc. Similarly, it is possible for an item to be clustered into many groups based on, for example, media type, genre, price, etc.

SUMMARY OF THE INVENTION

Several embodiments of the invention advantageously address the needs above as well as other needs by providing a preference prediction system and method. In one embodiment, the invention can be characterized as a computer-implemented method that includes obtaining a dataset representing a plurality of users, a plurality of items, and a plurality of ratings given to items by users; clustering the plurality of users into a plurality of user-groups such that at least one user belongs to more than one user-group; clustering the plurality of items into a plurality of item-groups such that at least one item belongs to more than one item-group; inducing a model describing a probabilistic relationship between the plurality of users, items, ratings, user-groups, and item-groups, the induced model defined by a plurality of model parameters; and predicting a rating of a user for an item using the induced model.

In another embodiment, the invention can be characterized as a machine-readable medium having instructions stored thereon for execution by a processor to perform a method that includes obtaining a dataset representing a plurality of users, a plurality of items, and a plurality of ratings given to items by users; clustering the plurality of users into a plurality of user-groups such that at least one user belongs to more than one user-group; clustering the plurality of items into a plurality of item-groups such that at least one item belongs to more than one item-group; inducing a model describing a probabilistic relationship between the plurality of users, items, ratings, user-groups, and item-groups, the induced model defined by a plurality of model parameters; and predicting a rating of a user for an item using the induced model.

BRIEF DESCRIPTION OF THE DRAWINGS

The above and other aspects, features and advantages of several embodiments of the present invention will be more apparent from the following more particular description thereof, presented in conjunction with the following drawings.

FIGS. 5-9 illustrate exemplary table structures generated from the multiway linking step in accordance with several embodiments of the present invention.

Figure 1:
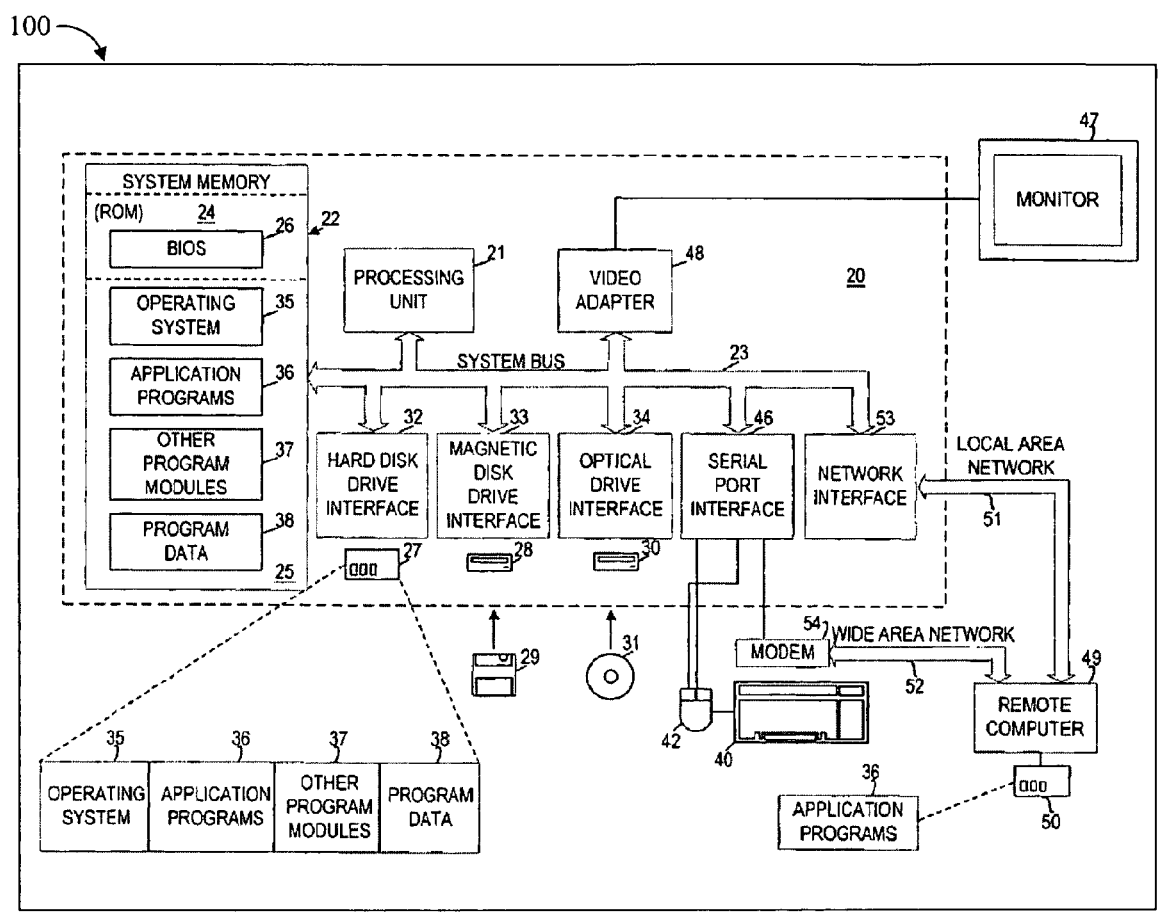
FIG. 1 illustrates an exemplary hardware and operating environment suitable for implementing a preference prediction system and method in accordance with embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. These embodiments are described in sufficient detail to enable those skilled in the art to practice the invention, and it is to be understood that other embodiments may be utilized and that logical, mechanical, electrical and other changes may be made without departing from the spirit or scope of the invention. The scope of the invention should be determined with reference to the claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. AU of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It will be appreciated that more or fewer processes may be incorporated into the methods illustrated in the flow diagrams discussed below without departing from the scope of the invention. Describing the methods by reference to a flow diagram enables one skilled in the art to develop such programs including such instructions to carry out the methods on suitably configured hardware platforms and operating environments. The computer-executable instructions may be written in a computer programming language or may be embodied in firmware logic. If written in a programming language conforming to a recognized standard, such instructions can be executed on a variety of hardware platforms and operating environments and for interface to a variety of operating systems. In addition, embodiments of the present invention are not described with reference to any particular programming language. It will be appreciated that a variety of programming languages may be used to implement the teachings of the disclosed embodiments.

FIG. 1 illustrates a diagram of the hardware and operating environment in conjunction with which embodiments of a preference prediction system 100 and its associated method may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring to FIG. 1, an exemplary hardware and operating environment suitable for implementing the preference prediction system 100 and its associated method includes a general purpose computing device in the form of a computer 20 including a processing unit 21, system memory 22, system bus 23, hard disk drive 27, magnetic disk drive 28, optical disk drive 30, hard disk drive interface 32, magnetic disk drive interface 33, optical disk drive interface 34, a serial port interface 46, a video adapter 48, and a network interface 53. The system memory 22 includes read only memory (ROM) 24 and random access memory (RAM) 25. The ROM 24 includes, for example, a basic input/output system (BIOS) 26. The RAM 25 includes, for example, operating system 35, application programs 36, program modules 37, and program data 38. The hard disk drive 27 may, for example, store an operating system 35, application programs 36, program modules 37, and program data 38. Also shown are a magnetic disk 29, an optical disk 31, input devices (e.g., a keyboard 40, a pointing device 42), a display device (e.g., a monitor) 47, a remote computer 49, a modem 54, a local-area network 51 (LAN), a memory storage unit 50, and a wide-area network (WAN) 52.

The system bus 23 may be any of several types of bus structures including a memory bus or memory controller, a peripheral bus, and a local bus using any of a variety of bus architectures. The BIOS 26 contains the basic routines that help to transfer information between elements within the computer 20 such as during start-up.

The hard disk drive 27, magnetic disk drive 28, and optical disk drive 30 are connected to the system bus 23 by a hard disk drive interface 32, a magnetic disk drive interface 33, and an optical disk drive interface 34, respectively. The hard disk drive 27 reads from and/or writes to a hard disk (not shown), the magnetic disk drive 28 reads from and/or writes to a removable magnetic disk 29, and the optical disk drive 30 reads from and/or writes to a removable optical disk 31 (e.g., a CD ROM, etc.). Thus, the drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A user may enter commands and information into the personal computer 20 through input devices such as a keyboard 40 and pointing device 42. Other input devices (not shown) may include a microphone, joystick, game pad, satellite dish, scanner, or the like. These and other input devices can be connected to the processing unit 21 through the serial port interface 46 that is coupled to the system bus 23, but may also be connected by other interfaces, such as a parallel port, game port, or a universal serial bus (USB). The display device 47 is connected to the system bus 23 via the video adapter 48. In addition to the display device 47, the computer 20 can also include other peripheral output devices (not shown), such as speakers and printers.

The computer 20 may operate in a networked environment using logical connections (e.g., LAN 51 and/or WAN 52) to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. Such networking environments are commonplace in office networks, enterprise-wide computer networks, intranets and the Internet, which are all types of networks.

When used in a LAN-networking environment, the computer 20 is connected to the LAN 51 through network interface or adapter 53, which is one type of communications device. When used in a WAN-networking environment, the computer 20 includes a communications device (e.g., a modem 54, or the like) to establishing communications over the WAN 52 (e.g., the Internet). In one embodiment, the modem 54 may be internal or external and can be connected to the system bus 23 via the serial port interface 46. In a networked environment, program modules depicted relative to the personal computer 20, or portions thereof, may be stored in the remote memory storage device 50. It is appreciated that the network connections shown are exemplary and other means of and communications devices for establishing a communications link between the computers may be used.

Figures 2, 3:
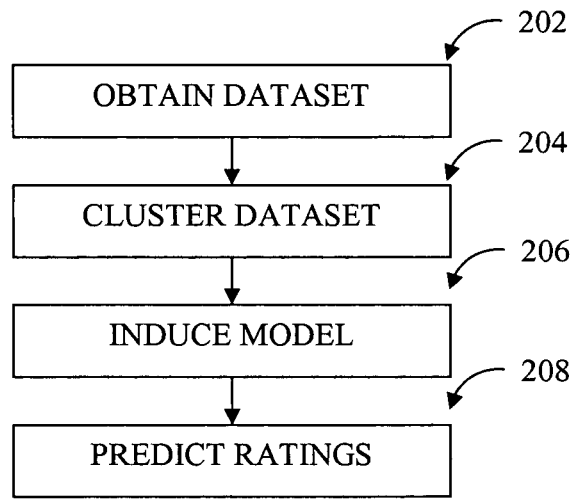
FIG. 2 illustrates an exemplary flowchart describing a preference prediction method in accordance with one embodiment of the present invention.
FIG. 3 illustrates an exemplary representation of the dataset used in conjunction with one embodiment of the present invention.

FIG. 2 illustrates an exemplary flowchart describing a preference prediction method in accordance with one embodiment of the present invention.

According to many embodiments of the present invention, the preference prediction system 100 employs a preference prediction method to predict ratings that a user would give to an item. Referring to FIG. 2, the preference prediction method generally includes the steps of obtaining a dataset (step 202), clustering the dataset (step 204), inducing a model from the clustered dataset (step 206), and predicting ratings for a user using the induced model (step 208).

FIG. 3 illustrates an exemplary representation of the dataset used in conjunction with one embodiment of the present invention.

In one embodiment, the dataset obtained in step 202 can be stored within the preference prediction system 100. For example, the dataset can be obtained from within the computer 20 (e.g., within RAM 25, hard disk 27, etc.), or received from the magnetic disk 29, the optical disk 31, the LAN 51, the WAN 52, or the like, or combinations thereof, and stored within the computer 20.

According to various embodiments of the present invention, the dataset obtained in step 202 represents a plurality users, items, and ratings given to items by users. As shown in FIG. 3, the dataset identifies m users $\{u_1, u_2, u_3, \ldots, u_m\}$, n items $\{v_1, v_2, v_3, \ldots, v_n\}$, and r ratings indicating a particular rating w given for a particular item v by a particular user u. Generally, the rating w indicates the strength of a particular user's preference for a particular item (e.g., a low value indicating a user's dislike for an item, a high number indicating a user's preference for the item, etc.).

In one embodiment, the dataset shown in FIG. 3 can be represented as a contingency table consisting of d entries of combinations of users (U), items (V), and ratings (W) such that d=m×n×r. Accordingly, each entry in the contingency table is a 3-tuple of the form (U, V, W).

Figure 4:
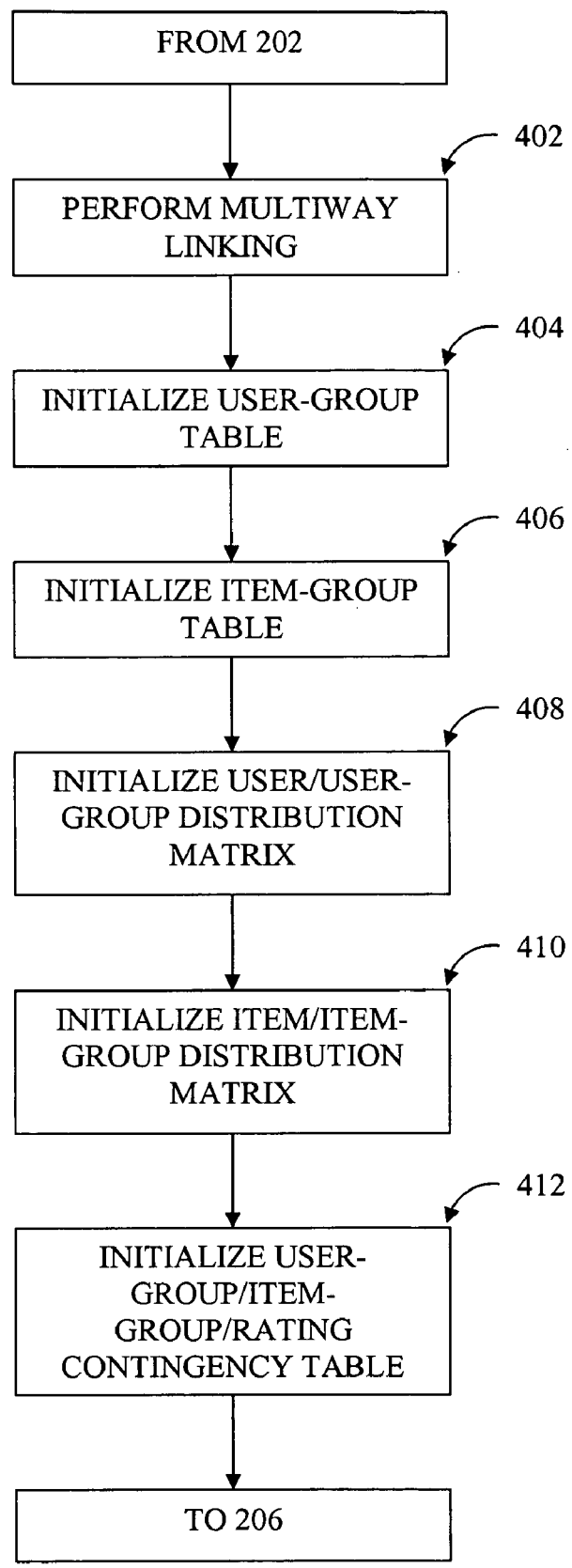
FIG. 4 illustrates an exemplary flowchart describing a multiway linking step in accordance with one embodiment of the present invention.

FIG. 4 illustrates an exemplary flowchart describing a multiway linking step in accordance with one embodiment of the present invention.

To cluster the dataset obtained in step 202, a multiway linking step is performed (step 402). As used herein, the term "multiway linking" refers to grouping data into groups that share some common trait (e.g., categorical label). Based on results of the multiway linking step 402, a user-group table is initialized (step 404), an item-group table is initialized (step 406), a user/user-group table is initialized (step 408), an item/item-group table is initialized (step 410), and a user-group/item-group/rating contingency table is initialized (step 412).

As a result of the multiway linking step 402, each user represented within the dataset is explicitly linked to multiple user-groups characterized, for example, by user interest (e.g., cooking, gardening, movies, etc.) and each item represented within the dataset is linked to multiple item-groups characterized, for example, by type (e.g., music, video, print, etc.), genre (e.g., romance, history, action, etc.). In one embodiment, links between users and user-groups can be accomplished, for example, by analyzing a survey completed by a particular user. As will be shown in greater detail below, ratings that a user gives to an item can be used as a measure of the strength the links created.

As a result of the multiway linking step, the users (U) are distributed across a set of g user-groups, $Z^u = \{z_1^u, z_2^u, z_3^u, \ldots, z_g^u\}$ and the items (V) are distributed across a set of h item-groups, $Z^v = \{z_1^v, z_2^v, z_3^v, \ldots, z_h^v\}$, wherein $Z^u$ is a multinomial user-group indicator variable having a range $1 \leq Z^u \leq g$ and $Z^v$ is a multinomial item-group indicator variable having a range $1 \leq Z^v \leq h$.

Figures 5, 6:
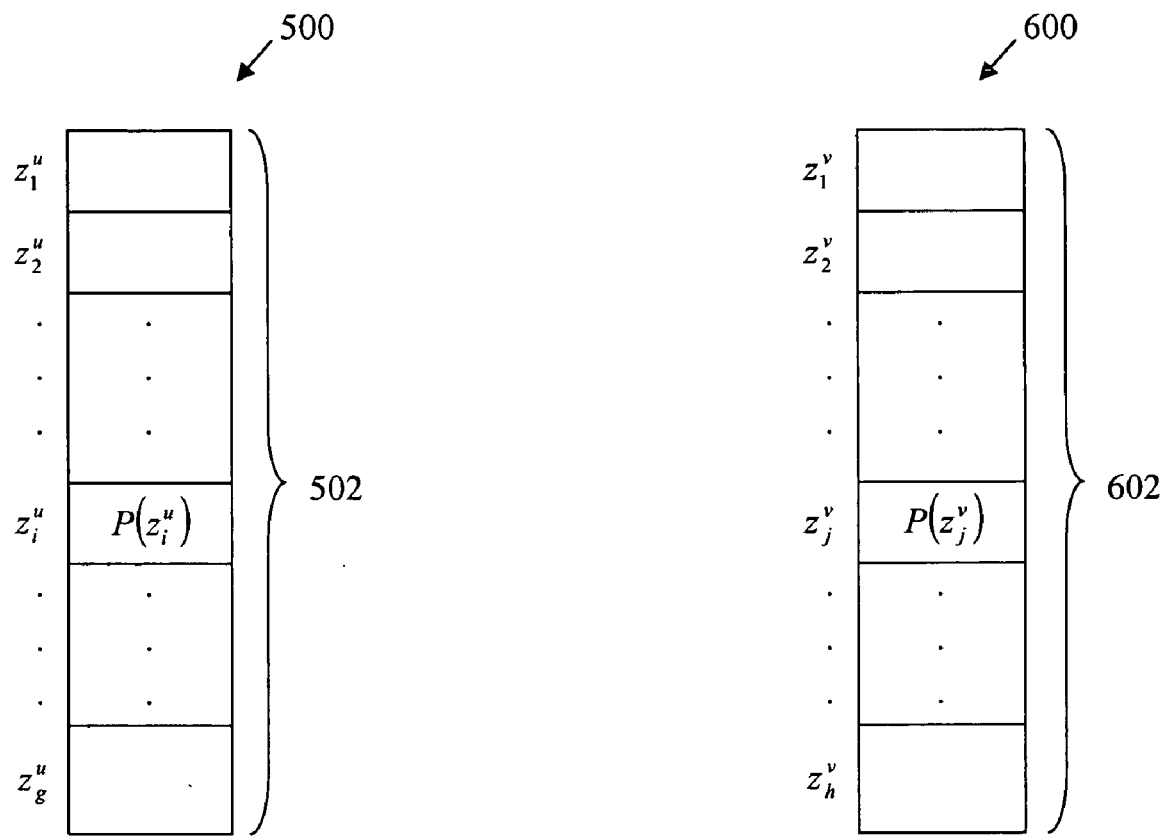

Referring to FIG. 5, the user-group table 500 initialized at step 404 contains a plurality of fields 502 identified by g corresponding user-group indicators $Z^u$ from $z_1^u$ to $z_g^u$. In one embodiment, each field 502 is populated with a value representing a marginal probability distribution of a particular user-group over the set of g user-groups $\{z_1^u, z_2^u, z_3^u, \ldots, z_g^u\}$. For example, one field 502 identifies the marginal probability distribution $P(z_i^u)$ of an $i^{th}$ user group $z_i^u$ over the set of g user-groups $\{z_1^u, z_2^u, z_3^u, \ldots, z_g^u\}$. In another embodiment, the fields 502 are populated with values upon inducing the model from the obtained dataset in step 206. Accordingly, values within the fields 502 represent parameters of the model induced in step 206.

Referring to FIG. 6, the item-group table 600 initialized at step 406 contains a plurality of fields 602 identified by h corresponding item-group indicators $Z^v$ from $z_1^v$ to $z_h^v$. In one embodiment, each field 602 is populated with a value representing a marginal probability distribution of a particular user-group over the set of h item-groups $\{z_1^v, z_2^v, z_3^v, \ldots, z_h^v\}$. For example, one field 602 identifies the marginal probability distribution $P(z_j^v)$ of an $j^{th}$ item-group $z_j^v$ over the set of h item-groups $\{z_1^v, z_2^v, z_3^v, \ldots, z_h^v\}$. In another embodiment, the fields 602 are populated with values upon inducing the model from the obtained dataset in step 206. Accordingly, values within the fields 602 represent parameters of the model induced in step 206.

Referring to FIG. 7, the user/user-group table 700 initialized at step 408 contains a plurality of fields 702 arranged in m rows representing users, U, and h columns representing user-groups $Z^u$. In one embodiment, each field 702 is populated with a value representing a conditional probability that, given a certain user-group $Z^u$, a particular user U belongs to that user-group $Z^u$. For example, one field 702 identifies the conditional probability $P(U|Z^u)$ that, given user-group $z_i^u$, user $u_x$ belongs to user-group $z_i^u$. In another embodiment, the fields 702 are populated with values upon inducing the model from the obtained dataset in step 206. Accordingly, values within the fields 702 represent parameters of the model induced in step 206.

Referring to FIG. 8, the item/item-group table 800 initialized at step 410 contains a plurality of fields 802 arranged in n rows representing items, V, and h columns representing item-groups $Z^v$. In one embodiment, each field 802 is populated with a value representing a conditional probability that, given a certain item-group $Z^v$, a particular item V belongs to that item-group $Z^v$. For example, one field 802 identifies the conditional probability $P(V|Z^v)$ that, given item-group $z_j^v$, item $v_y$ belongs to item-group $z_j^v$. In another embodiment, the fields 802 are populated with values upon inducing the model from the obtained dataset in step 206. Accordingly, values within the fields 802 represent parameters of the model induced in step 206.

Figure 9:
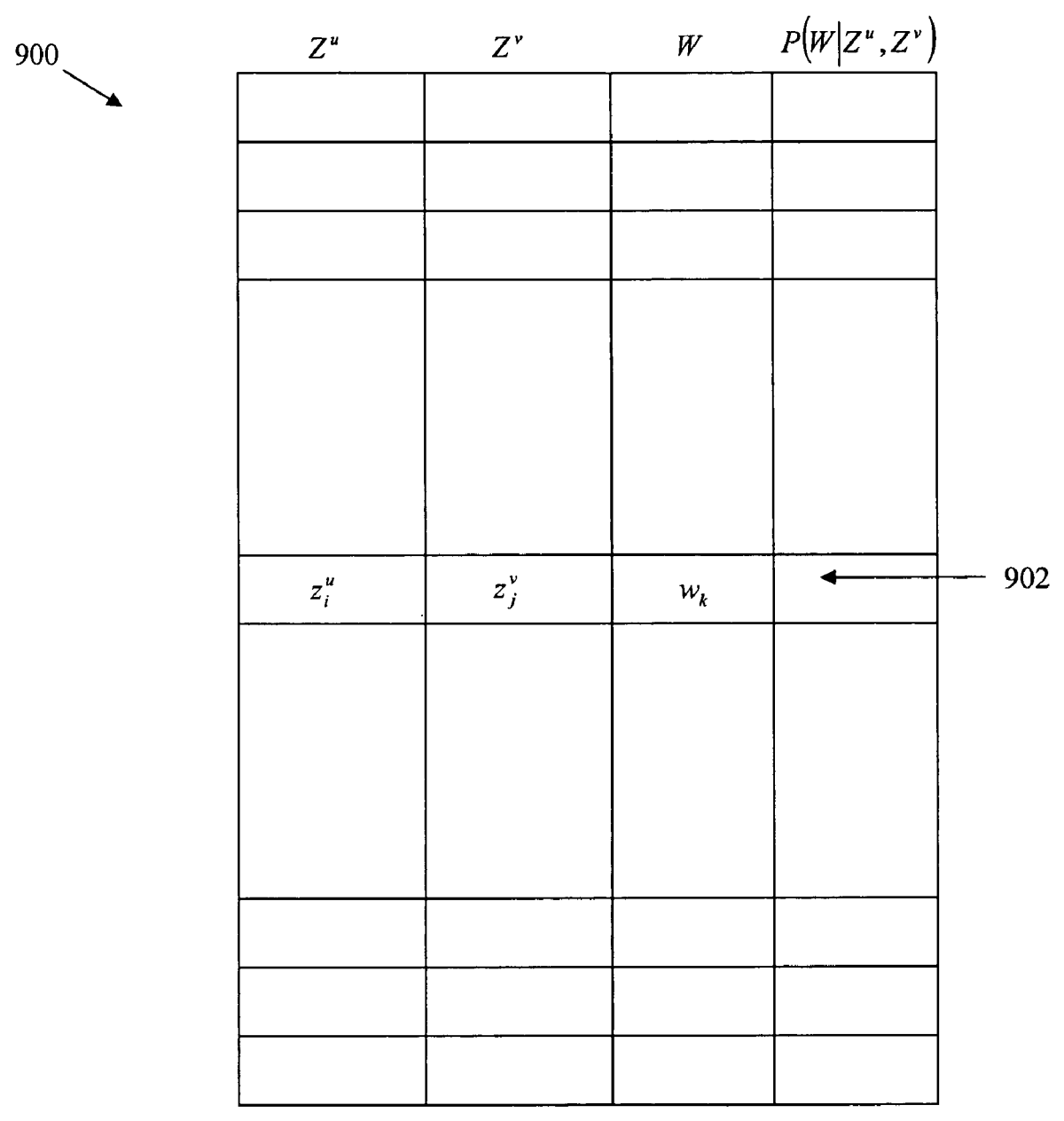

Referring to FIG. 9, the user-group/item-group/contingency table 900 initialized at step 412 contains a plurality of fields containing values identifying the user-group indicators $Z^u$ and item-group indicators $Z^u$ generated in step 402, ratings W assigned by users U clustered within each user group $Z^u$ for items V clustered within each item group $Z^v$, and a plurality of fields 902 arranged in a column representing the conditional probability $P(W|Z^u, Z^v)$ of an assigned rating W given particular user- and item-groups $Z^u$ and $Z^v$. For example, one row of the contingency table 900 initiated in step 412 identifies an $i^{th}$ user group $z_i^u$, a $j^{th}$ item-group $z_j^v$, and a rating $w_k$ given by user $u_x$, belonging to the $i^{th}$ user group $z_i^u$ for an item $v_y$ belonging to the $j^{th}$ item-group $z_j^v$. Accordingly, values within the fields 902 represent parameters of the model induced in step 206.

Figure 10:
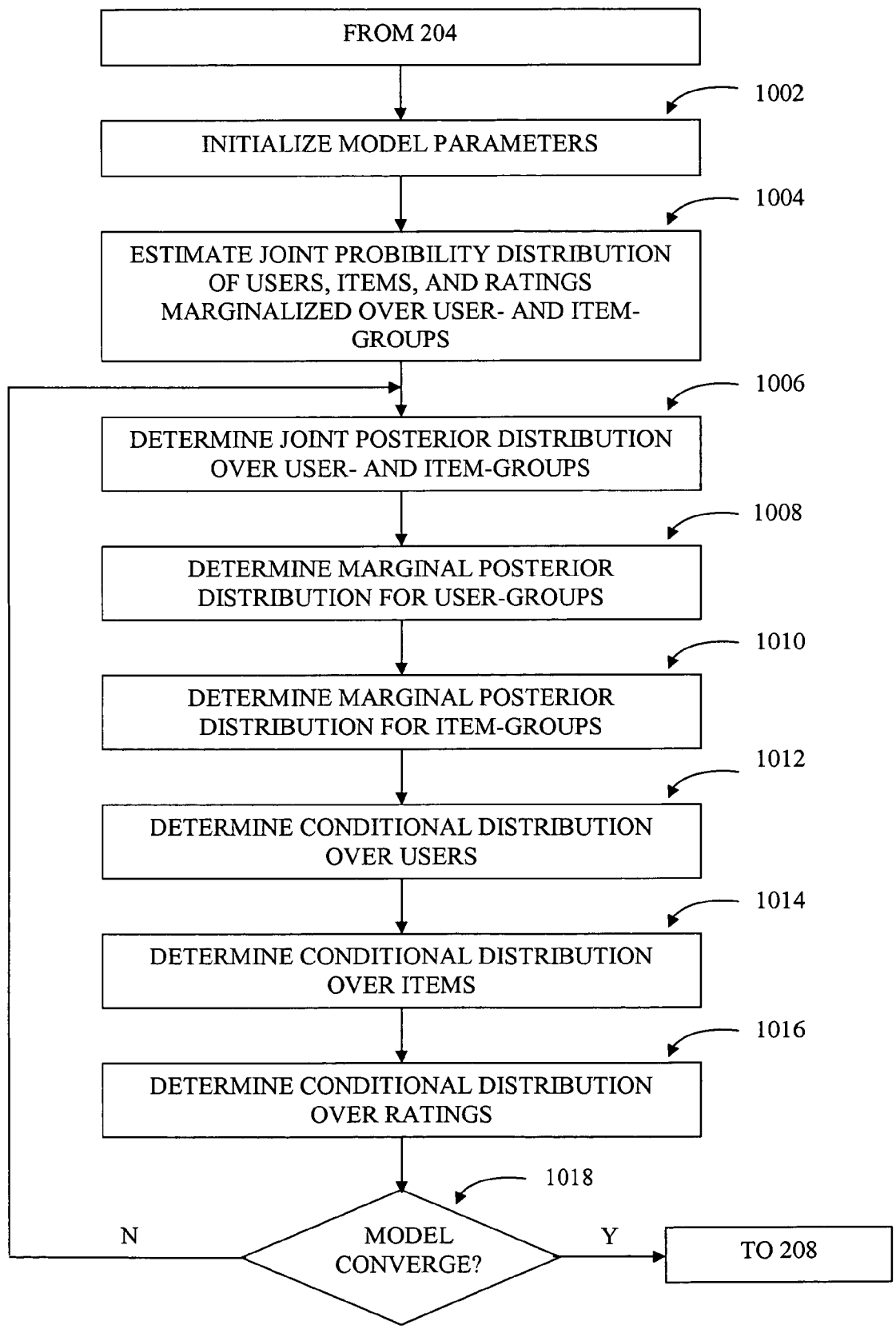
FIG. 10 illustrates an exemplary flowchart describing a model induction step in accordance with one embodiment of the present invention.

FIG. 10 illustrates an exemplary flowchart describing a model induction step in accordance with one embodiment of the present invention.

In one embodiment, induction of the model in step 206 can be accomplished by, for example, initializing parameters for the model (step 1002) followed by estimating the joint probability distribution P(U, V, W) (i.e., the model) over users, items, and ratings represented within the dataset obtained in step 202 (step 1004), determining the joint posterior distribution over the user- and item-groups using the joint probability distribution determined in step 1004 (step 1006) and, using the joint posterior distribution determined in step 1006, determining the marginal probability distribution $P(Z^u)$ of each user-group over the set of g user-groups $\{z_1^u, z_2^u, z_3^u, \ldots, z_g^u\}$ and populating fields 502 with the determined marginal probabilities (step 1008), determining the marginal probability distribution $P(Z^v)$ of each item-group over the set of h item-groups $\{z_1^v, z_2^v, z_3^v, \ldots, z_h^v\}$ and populating fields 602 with the determined marginal probabilities (step 1010), determining the conditional probability distribution $P(U|Z^u)$ of users u given the user-groups $Z^u$ and populating fields 702 with the determined conditional probabilities (step 1012), determining the conditional probability distribution $P(V|Z^v)$ of items v given the item-groups $Z^v$ and populating fields 802 with the determined conditional probabilities (step 1014), determining the conditional probability $P(W|Z^u, Z^v)$ of ratings W given the user- and item-groups $Z^u$ and $Z^v$ and populating fields 902 with the determined conditional probabilities (step 1016), and determining whether the induced model converges (i.e., determining whether values of the model parameters determined in steps 1008-1016 a joint probability distribution over users, items, and ratings that converges upon the joint probability distribution estimated in step 1004) (step 1018).

If, as a result of step 1018, the preference prediction system 100 determines that the model does not converge, the model parameters computed in steps 1008-1016 are used to determine a new joint posterior distribution over the user- and item-groups in step 1004 and the new joint posterior distribution is used to re-compute the model parameters in steps 1008-1016. Thus, the above described process is iteratively repeated to obtain an optimal model of the dataset obtained in step 202. Conceptually, this iterative process can be characterized as a probabilistic optimization technique. Once the preference prediction system 100 determines in step 1018 that the model does converge, the model parameters computed in steps 1008-1016 can be used to predict ratings in step 208.

In one embodiment, the joint probability distribution $P(U, V, W)$ of users, items, and ratings can be estimated in step 1004 by marginalizing over the user- and item-groups obtained in step 204 according to the following formula:

$$P(U, V, W) = \sum_{Z^u=1}^{g} \sum_{Z^v=1}^{h} P(Z^u)P(Z^v)P(U|Z^u)P(V|Z^v)P(W|Z^u, Z^v),$$

wherein initial estimates for the model parameters $P(Z^u)$, $P(Z^v)$, $P(U|Z^u)$, $P(U|Z^v)$, and $P(W|Z^u, Z^v)$ are initially estimated based on objective or subjective criteria.

In one embodiment, the joint posterior distribution determined in step 1006 is determined according to the following formula:

$$P(Z^u, Z^v | U, V, W) = \frac{P(U, Z^u, V, Z^v, W)}{P(U, V, W)}$$

$$= \frac{P(Z^u)P(Z^v)P(U|Z^u)P(V|Z^v)P(W|Z^u, Z^v)}{\sum_{Z^u=1}^{g} \sum_{Z^v=1}^{h} P(Z^u)P(Z^v)P(U|Z^u)P(V|Z^v)P(W|Z^u, Z^v)}$$

In one embodiment, the marginal and conditional distributions calculated in steps 1008-1016 are determined according to the following formulas:

$$P(Z^u) = \frac{1}{d} \sum_{i=1}^{d} \sum_{Z^v=1}^{h} P(Z^u, Z^v | U_i, V_i, W_i),$$

$$P(Z^v) = \frac{1}{d} \sum_{i=1}^{d} \sum_{Z^u=1}^{g} P(Z^u, Z^v | U_i, V_i, W_i),$$

$$P(U|Z^u) = \frac{1}{dP(Z^u)} \sum_{U=U_i} \sum_{Z^v=1}^{h} P(Z^u, Z^v | U_i, V_j, W_k),$$

$$P(U|Z^v) = \frac{1}{dP(Z^v)} \sum_{V=V_j} \sum_{Z^u=1}^{g} P(Z^u, Z^v | U_i, V_j, W_k),$$

and $$P(W|Z^u, Z^v) = \frac{\sum_{W=W_k} P(Z^u, Z^v | U_i, V_j, W_k)}{\sum_{i=1}^{d} P(Z^u, Z^v | U_i, V_i, W_i)}.$$

Figure 11:
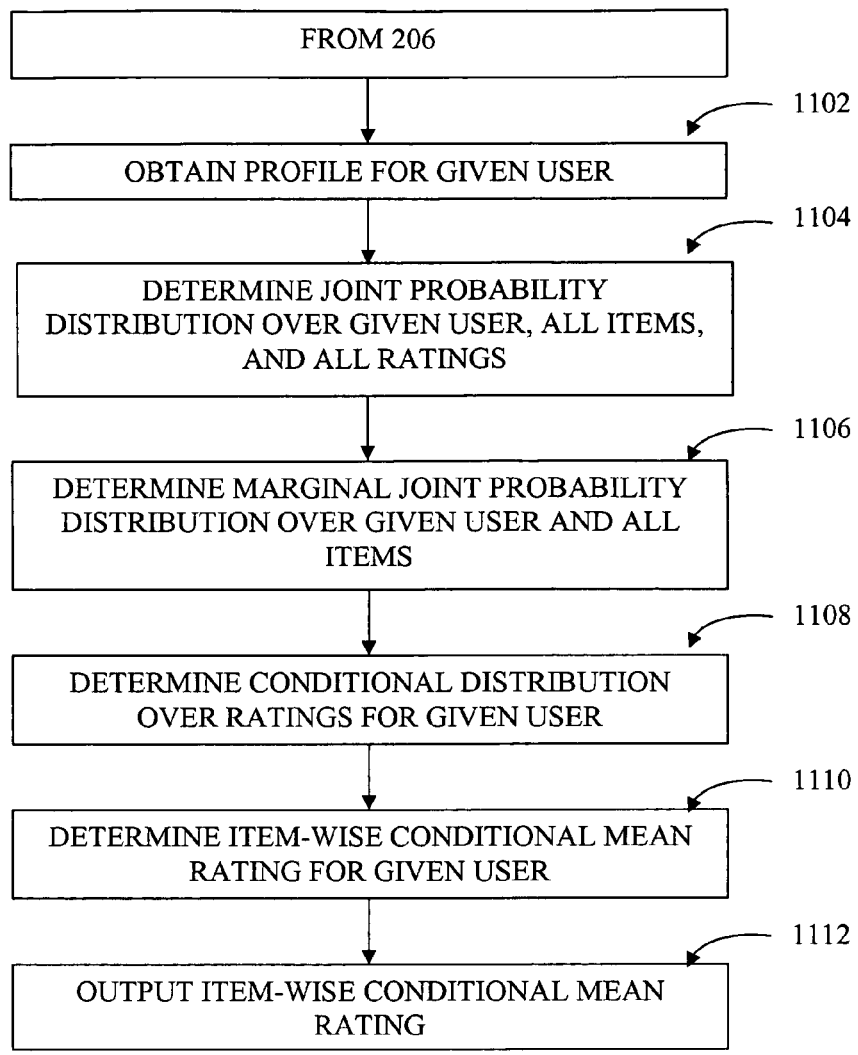
FIG. 11 illustrates an exemplary flowchart describing a preference prediction step in accordance with one embodiment of the present invention.

FIG. 11 illustrates an exemplary flowchart describing a preference prediction step in accordance with one embodiment of the present invention.

In one embodiment, ratings for that a particular user will give to a particular item can be predicted in step 208 can be accomplished by, for example, obtaining a profile for a given (i.e., test) user, $U^t$ (step 1102), determining the joint probability distribution $P(U^t, V, W)$ over the test user and all items and ratings represented within the dataset obtained in step 202 (step 1104), marginalizing the joint probability determined in step 1104 to determine the marginal joint probability distribution $$\sum_W P(U^t, V, W)$$

over the test user $U^t$ and all items V (step 1106), determining the conditional distribution $P(W|U^t, V)$ over the ratings for the test user $U^t$ using the marginalized joint probability distribution determined in step 1106 (step 1108), determining the item-wise conditional mean rating $\overline{W}|V$ for the test user $U^t$ (step 1110), and treating the conditional mean rating $\overline{W}|V$ determined in step 1110 as the predicted rating for a given item V represented within the dataset obtained in step 202 (step 1112).

In one embodiment, the user profile obtained in step 1102 contains a non-trivial set of q item-wise ratings (e.g., $\{(V_1^t, W_1^t), (V_2^t, W_2^t), \ldots, (V_q^t, W_q^t)\}$). In another embodiment, the user profile the dataset obtained in step 1102 can be stored within the preference prediction system 100. Alternatively and/or additionally, a user profile can be received by the preference prediction system 100 from the test user over a network such as the Internet, or the like.

In one embodiment, the joint probability distribution $P(U^t, V, W)$ over the test user and all items and ratings can be determined in step 1104 by marginalizing over the user- and item-groups obtained in step 204 according to the following formula:

$$P(U^t, V, W) = \sum_{Z^u=1}^{g} \sum_{Z^v=1}^{h} P(Z^u)P(Z^v)P(U^t|Z^u)P(V|Z^v)P(W|Z^U, Z^V),$$

wherein values for the model parameters $P(Z^u)$, $P(Z^v)$, $P(U|Z^u)$, $P(U|Z^v)$, and $P(W|Z^u, Z^v)$ are obtained as a result of the model induction step 206, and $P(U^t|Z^u)$ is determined according to the following formula:

$$P(U^t \mid Z^u) = \frac{1}{dP(Z^u)} \sum_{U=U^t} \sum_{Z^v=1}^{h} P(Z^u, Z^v \mid U^t, V_j, W_k).$$

In one embodiment, the conditional distribution $P(W|U^t, V)$ determined in step 1108 is determined according to the following formula:

$$P(W \mid U^t, V) = \frac{P(U^t, V, W)}{\sum_W P(U^t, V, W)}$$

In one embodiment, the item-wise conditional mean rating $\overline{W}|V$ for the test user determined in step 1110 is determined by taking expectation with respect to the conditional distribution of the ratings as follows:

$$\overline{W} \mid V = \sum_W W \times P(W \mid U^t, V) = \sum_W W \times \frac{P(U^t, V, W)}{\sum_W P(U^t, V, W)}.$$

Figure 12:
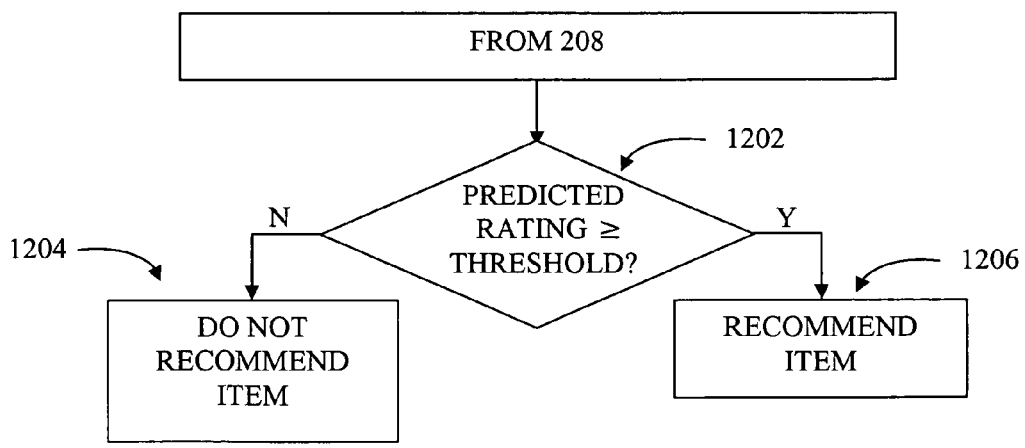
FIG. 12 illustrates an exemplary flowchart describing a recommendation process in accordance with one embodiment of the present invention.

FIG. 12 illustrates an exemplary flowchart describing a recommendation process in accordance with one embodiment of the present invention.

In one embodiment, the preference prediction system 100 can be adapted to recommend an item to the user based on ratings predicted by the preference prediction method exemplarily described above with respect to FIGS. 2-11. For example, and with reference to FIG. 12, once a rating has been predicted for each item as desired, the preference prediction system 100 determines whether the predicted rating is greater than or equal to a threshold value (step 1202). If it is determined that the rating predicted for a particular item is, for example, less than a predetermined threshold value, the preference prediction system 100 will not recommend the item to the test user (step 1204). However, if it is determined that the rating predicted for a particular item is, for example, greater than or equal to the predetermined threshold value, the preference prediction system 100 will recommend the item to the test user (step 1206).

While the invention herein disclosed has been described by means of specific embodiments, examples and applications thereof, numerous modifications and variations could be made thereto by those skilled in the art without departing from the scope of the invention set forth in the claims.

What is claimed is:

1. A computer-implemented method, comprising:
    obtaining a dataset representing a plurality of users, a plurality of items, and a plurality of ratings given to items by users;
    clustering the plurality of users into a plurality of user-groups such that at least one user belongs to more than one user-group;
    clustering the plurality of items into a plurality of item-groups such that at least one item belongs to more than one item-group;
    inducing a model describing a probabilistic relationship between the plurality of users, items, ratings, user-groups, and item-groups, the induced model defined by a plurality of model parameters; and
    predicting a rating of a user for an item using the induced model.

2. The computer-implemented method of claim 1, wherein clustering the plurality of users and items into the plurality of user-groups and item-groups, respectively, includes performing a multiway linking process on the obtained dataset.

3. The computer implemented method of claim 1, wherein the model parameters include:
    a marginal probability distribution of user-groups;
    a marginal probability distribution of item-groups;
    a conditional probability distribution of users given the user-groups;
    a conditional probability distribution of items given the item-groups; and
    a conditional probability distribution of ratings given the user- and item-groups.

4. The computer-implemented method of claim 3, wherein inducing the model includes estimating values for the model parameters in a statistical optimization procedure.

5. The computer-implemented method of claim 4, wherein values for the model parameters are estimated by:
    estimating a joint distribution of the user- and item-groups using predetermined values for the model parameters;
    computing values for the model parameters based on the estimated joint distribution; and
    iteratively performing the estimating and computing until the model parameters converge, wherein the joint distribution estimated in a given iteration is estimated using model parameter values computed in a preceding iteration.

6. The computer-implemented method of claim 1, wherein predicting the rating of the user includes:
    receiving a query from the user; and
    generating a predicted rating based on the received query.

7. The computer-implemented method of claim 1, wherein predicting the rating of the user includes:
    determining a profile specific to the user; and
    generating a predicted rating based on the determined profile.

8. The computer-implemented method of claim 1, further comprising recommending an item to the user based on the predicted rating for the item.

9. The computer-implemented method of claim 8, further comprising:
    determining whether a predicted rating for an item exceeds a predetermined value; and
    recommending an item to the user when the predicted rating for the item is determined to exceed the predetermined value.

10. A machine-readable medium having instructions tangibly stored thereon for execution by a processor to perform a method comprising:
    obtaining a dataset representing a plurality of users, a plurality of items, and a plurality of ratings given to items by users;
    clustering the plurality of users into a plurality of user-groups such that at least one user belongs to more than one user-group;
    clustering the plurality of items into a plurality of item-groups such that at least one item belongs to more than one item-group;
    inducing a model describing a probabilistic relationship between the plurality of users, items, ratings, user-groups, and item-groups, the induced model defined by a plurality of model parameters; and
    predicting a rating of a user for an item using the induced model.

11. The machine-readable medium of claim 10, the method further comprising linking the plurality of users and items represented by the dataset with the plurality of user-groups and item-groups, respectively.

12. The machine-readable medium of claim 10, wherein the model parameters include:
- a marginal probability distribution of user-groups;
- a marginal probability distribution of item-groups;
- a conditional probability distribution of users given the user-groups;
- a conditional probability distribution of items given the item-groups; and
- a conditional probability distribution of ratings given the user- and item-groups.

13. The machine-readable medium of claim 12, the method further comprising inducing the model by estimating values for the model parameters in a statistical optimization procedure.

14. The machine-readable medium of claim 13, wherein values for the model parameters are estimated by:
- estimating a joint distribution of the user- and item-groups using predetermined values for the model parameters;
- computing values for the model parameters based on the estimated joint distribution; and
- iteratively performing the estimating and computing until the model parameters converge, wherein the joint distribution estimated in a given iteration is estimated using model parameter values computed in a preceding iteration.

15. The machine-readable medium of claim 10, the method further comprising predicting the rating of the user by:
- receiving a query from the user; and
- generating a predicted rating based on the received query.

16. The machine-readable medium of claim 10, the method further including predicting the rating of the user by:
- determining a profile specific to the user; and
- generating a predicted rating based on the determined profile.

17. The machine-readable medium of claim 10, the method further comprising recommending an item to the user based on the predicted rating for the item.

18. The machine-readable medium of claim 17, the method further comprising:
- determining whether a predicted rating for an item exceeds a predetermined value; and
- recommending an item to the user when the predicted rating for the item is determined to exceed the predetermined value.

* * * * *

UNITED STATES PATENT AND TRADEMARK OFFICE
CERTIFICATE OF CORRECTION

| | | |
|---|---|---|
| PATENT NO. | : 8,341,158 B2 | Page 1 of 1 |
| APPLICATION NO. | : 11/284603 | |
| DATED | : December 25, 2012 | |
| INVENTOR(S) | : Acharya | |

It is certified that error appears in the above-identified patent and that said Letters Patent is hereby corrected as shown below:

On the TITLE PAGE:
Item 56 OTHER PUBLICATIONS, line 1, delete "Emperical" and insert --Empirical--.

Signed and Sealed this
Twenty-eighth Day of May, 2013

Teresa Stanek Rea
*Acting Director of the United States Patent and Trademark Office*